United States Patent
Niwa et al.

(10) Patent No.: US 9,279,893 B2
(45) Date of Patent: Mar. 8, 2016

(54) RADIATION IMAGING CONTROL APPARATUS, RADIATION IMAGING SYSTEM AND RADIATION IMAGING APPARATUS, AND METHOD FOR CONTROLLING THE SAME

(71) Applicant: CANON KABUSHIKI KAISHA, Tokyo (JP)

(72) Inventors: Hiroaki Niwa, Kawasaki (JP); Shigeo Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/948,949

(22) Filed: Jul. 23, 2013

(65) Prior Publication Data

US 2014/0029721 A1    Jan. 30, 2014

(30) Foreign Application Priority Data

Jul. 24, 2012  (JP) .................. 2012-164129
Jul. 31, 2012  (JP) .................. 2012-169968

(51) Int. Cl.

| | | |
|---|---|---|
| *G01N 23/04* | (2006.01) | |
| *G01T 1/24* | (2006.01) | |
| *H04N 5/32* | (2006.01) | |

(52) U.S. Cl.
CPC ... *G01T 1/24* (2013.01); *H04N 5/32* (2013.01)

(58) Field of Classification Search
CPC ....... G01N 23/00; G01N 23/02; G01N 23/04; G01N 23/043; H04N 5/321; H05G 1/60; G01T 1/2928; A61B 6/467; A61B 6/54
USPC ................... 378/62, 98, 98.2, 98.8, 114–116
See application file for complete search history.

(56) References Cited

U.S. PATENT DOCUMENTS

| | | | |
|---|---|---|---|
| 6,661,456 | B1 | 12/2003 | Aufrichtig et al. |
| 7,433,446 | B2 * | 10/2008 | Abe .............................. 378/114 |
| 2002/0190215 | A1 | 12/2002 | Tashiro et al. |
| 2003/0031353 | A1 | 2/2003 | Baertsch et al. |
| 2005/0220270 | A1 | 10/2005 | Kameshima et al. |
| 2007/0002942 | A1 | 1/2007 | Simpson et al. |
| 2007/0098236 | A1 | 5/2007 | Maack |

(Continued)

FOREIGN PATENT DOCUMENTS

| | | |
|---|---|---|
| EP | 1477932 A2 | 11/2004 |
| EP | 2106125 A2 | 9/2009 |

(Continued)

*Primary Examiner* — Jurie Yun
(74) *Attorney, Agent, or Firm* — Canon USA Inc. IP Division

(57) ABSTRACT

A radiation imaging control apparatus, which is communicable with a radiation imaging apparatus including a radiation sensor and capable of acquiring an X-ray moving image, includes a first communication unit configured to communicate with the radiation imaging apparatus via Ethernet communication, a second communication unit configured to communicate with the radiation imaging apparatus via at least a pair of bidirectional serial optical communication lines, a first control unit configured to cause the first communication unit to transmit a first signal for setting at least one parameter to the radiation imaging apparatus, a second control unit configured to cause the second communication unit to output data of the X-ray moving image received from the radiation imaging apparatus to an image processing unit, and transmit a second signal for some settings to the radiation imaging apparatus.

37 Claims, 9 Drawing Sheets

(56) References Cited

U.S. PATENT DOCUMENTS

| | | |
|---|---|---|
| 2008/0237507 A1 | 10/2008 | Enomoto |
| 2009/0135093 A1 | 5/2009 | Keuenhof |
| 2012/0138811 A1 | 6/2012 | Takenaka et al. |

FOREIGN PATENT DOCUMENTS

| | | |
|---|---|---|
| EP | 2244203 A1 | 10/2010 |
| EP | 2421250 A2 | 2/2012 |
| EP | 2448255 A1 | 5/2012 |
| JP | H04288151 A | 10/1992 |
| JP | 2002165782 A | 6/2002 |
| JP | 2002344809 A | 11/2002 |
| JP | 2003024317 A | 1/2003 |
| JP | 2005013310 A | 1/2005 |
| JP | 2008-029393 A | 2/2008 |
| JP | 2009201935 A | 9/2009 |
| JP | 2009284137 A | 12/2009 |
| JP | 2011-041039 A | 2/2011 |
| JP | 2012-110398 A | 6/2012 |
| WO | 2010084663 A1 | 7/2010 |
| WO | 2014/057377 A2 | 4/2014 |

\* cited by examiner

| IMAGING MODE | IMAGING CONDITION | | | CORRECTION USABLE |
|---|---|---|---|---|
| | BINNING | GAIN | ACCUMULATION TIME | |
| 1 | 1×1 | HIGH | 8.3 | ○ |
| 2 | | | 33 | ○ |
| 3 | | | 66 | |
| 4 | | MID | 8.3 | ○ |
| 5 | | | 33 | ○ |
| 6 | | | 66 | ○ |
| 7 | | LOW | 8.3 | |
| 8 | | | 33 | |
| 9 | | | 66 | ○ |
| 10 | 2×2 | HIGH | 8.3 | ○ |
| 11 | | | 33 | |
| 12 | | | 66 | |
| 13 | | MID | 8.3 | ○ |
| 14 | | | 33 | ○ |
| 15 | | | 66 | ○ |
| 16 | | LOW | 8.3 | |
| 17 | | | 33 | |
| 18 | | | 66 | ○ |
| 19 | 4×4 | HIGH | 8.3 | ○ |
| 20 | | | 33 | |
| 21 | | | 66 | |
| 22 | | MID | 8.3 | ○ |
| 23 | | | 33 | ○ |
| 24 | | | 66 | ○ |
| 25 | | LOW | 8.3 | |
| 26 | | | 33 | |
| 27 | | | 66 | ○ |

202

| CORRECTION DATA |
|---|
| offset1 |
| offset2 |
| offset4 |
| offset5 |
| offset6 |
| offset9 |
| offset10 |
| offset13 |
| offset14 |
| offset15 |
| offset18 |
| offset19 |
| offset22 |
| offset23 |
| offset24 |
| offset27 |

FIG.9

| IMAGING MODE | IMAGING CONDITION ||| CORRECTION USABLE |
|---|---|---|---|---|
| | BINNING | GAIN | ACCUMULATION TIME | |
| 1 | 1×1 | HIGH | 8.3 | |
| 2 | | | 33 | |
| 3 | | | 66 | |
| 4 | | MID | 8.3 | ○ |
| 5 | | | 33 | ○ |
| 6 | | | 66 | ○ |
| 7 | | LOW | 8.3 | |
| 8 | | | 33 | |
| 9 | | | 66 | ○ |
| 10 | 2×2 | HIGH | 8.3 | ○ |
| 11 | | | 33 | |
| 12 | | | 66 | |
| 13 | | MID | 8.3 | ○ |
| 14 | | | 33 | ○ |
| 15 | | | 66 | ○ |
| 16 | | LOW | 8.3 | |
| 17 | | | 33 | |
| 18 | | | 66 | ○ |
| 19 | 4×4 | HIGH | 8.3 | ○ |
| 20 | | | 33 | ○ |
| 21 | | | 66 | ○ |
| 22 | | MID | 8.3 | ○ |
| 23 | | | 33 | ○ |
| 24 | | | 66 | ○ |
| 25 | | LOW | 8.3 | ○ |
| 26 | | | 33 | ○ |
| 27 | | | 66 | ○ |

501

CORRECTION DATA (502):
- offset4
- offset5
- offset6
- offset9
- offset10
- offset13
- offset14
- offset15
- offset18
- offset19
- offset20
- offset21
- offset22
- offset23
- offset24
- offset25
- offset26
- offset27

RADIATION IMAGING CONTROL APPARATUS, RADIATION IMAGING SYSTEM AND RADIATION IMAGING APPARATUS, AND METHOD FOR CONTROLLING THE SAME

BACKGROUND OF THE INVENTION

1. Field of the Invention

The present invention relates to a radiation imaging control apparatus, a radiation imaging system and a radiation imaging apparatus, and a method for controlling the same.

2. Description of the Related Art

In the field of digital radiation imaging apparatuses, large-area flat panel type sensors have been widely used as equal-magnification optical systems that use a photoelectric conversion device instead of an image intensifier for the purpose of improving resolution, reducing the volume, and preventing an image from being distorted.

Imaging apparatuses using the photoelectric conversion device include an amorphous silicon type imaging apparatus, a charge coupled device (CCD) type imaging apparatus, and a complementary metal-oxide semiconductor (CMOS) type imaging apparatus. An imaging apparatus having a large imaging area size can be easily manufactured by employing an image sensor that uses an amorphous silicon semiconductor on a glass substrate. However, on the other hand, the amorphous silicon semiconductor does not have a sufficient semiconductor characteristic for the operation due to, for example, a difficulty of microfabricating the semiconductor substrate on the glass substrate compared to a single-crystal silicon semiconductor substrate, resulting in an increase in the capacity of an output signal line. The CCD type imaging apparatus is a complete depletion type and is highly sensitive, but is unsuitable for increasing an imaging area size because, for example, this imaging apparatus leads to an increase in the number of transmission stages for charge transmission as an imaging apparatus having a large imaging area size, and requires power consumption more than ten times compared to the CMOS type imaging apparatus.

US Unexamined Patent Application Publication NO. 2002/0190215 discusses a large-area flat panel type sensor using a CMOS type image sensor as a photoelectric conversion device. This sensor realizes a large area size by tiling rectangular semiconductor substrates, each of which is formed by cutting out a CMOS type photoelectric conversion device from a silicon semiconductor wafer into a rectangular shape. Due to microfabrication, the CMOS type image sensor allows data to be read out at a higher speed than the amorphous silicon type image sensor, and further, provides high sensitivity. Further, the CMOS type image sensor has no problem in the number of transmission stages for charge transmission and power consumption unlike the CCD type image sensor, thereby easily realizing a large imaging area size. It is known that the CMOS type image sensor is highly advantageous as a large-area flat panel type sensor, especially as a moving image capturing apparatus.

The state of an imaging apparatus shifts based on, for example, command communication from a command communication control apparatus to the imaging apparatus. Further, similarly, an imaging mode is also set based on command communication from the command communication control apparatus to the imaging apparatus. Then, the imaging apparatus becomes ready for an imaging operation through these respective processes of command communication.

However, execution of these respective processes of command communication requires a user to perform several operations on an operation panel, which raises a problem of the inability to deal with a sudden imaging request. Further, there is such a problem that desired command communication cannot be performed and therefore imaging is impossible, for example, when the command communication control apparatus is not started up or has gone down.

SUMMARY OF THE INVENTION

According to an aspect of the present invention, a radiation imaging control apparatus, which is communicable with a radiation imaging apparatus including a radiation sensor and capable of acquiring an X-ray moving image, includes a first communication unit configured to communicate with the radiation imaging apparatus via Ethernet communication, a second communication unit configured to communicate with the radiation imaging apparatus via at least a pair of bidirectional serial optical communication lines, a first control unit configured to cause the first communication unit to transmit a first signal for setting at least one parameter among a pixel sensitivity setting, a setting of a number of times of non-destructive reading, an analog binning setting, a digital binning setting, an accumulation time setting, and a reading area size setting to the radiation imaging apparatus, a second control unit configured to cause the second communication unit to output data of the X-ray moving image received from the radiation imaging apparatus to an image processing unit, and transmit a second signal for setting at least one of the pixel sensitivity setting, the setting of the number of times of non-destructive reading, the analog binning setting, the digital binning setting, the accumulation time setting, and the reading area size setting to a predetermined setting, to the radiation imaging apparatus, and a display unit configured to display the X-ray moving image on which image processing is performed by the image processing unit.

Further features of the present invention will become apparent from the following detailed description of exemplary embodiments with reference to the attached drawings.

BRIEF DESCRIPTION OF THE DRAWINGS

FIG. 6 illustrates an example of a structure of a table defining imaging modes in which an imaging apparatus can perform processing for correcting image data, and an example of a structure of a table storing correction data corresponding to each imaging mode in which the imaging apparatus can perform the processing for correcting image data according to a third exemplary embodiment.

FIG. 9 illustrates an example of a structure of a table defining imaging modes in which the imaging apparatus can perform the processing for correcting image data, and an example of a structure of a table storing correction data corresponding to each imaging mode in which the imaging apparatus can perform the processing for correcting image data according to the third exemplary embodiment.

DESCRIPTION OF THE EMBODIMENTS

First, a first exemplary embodiment of the present invention will be described.

Figure 1:
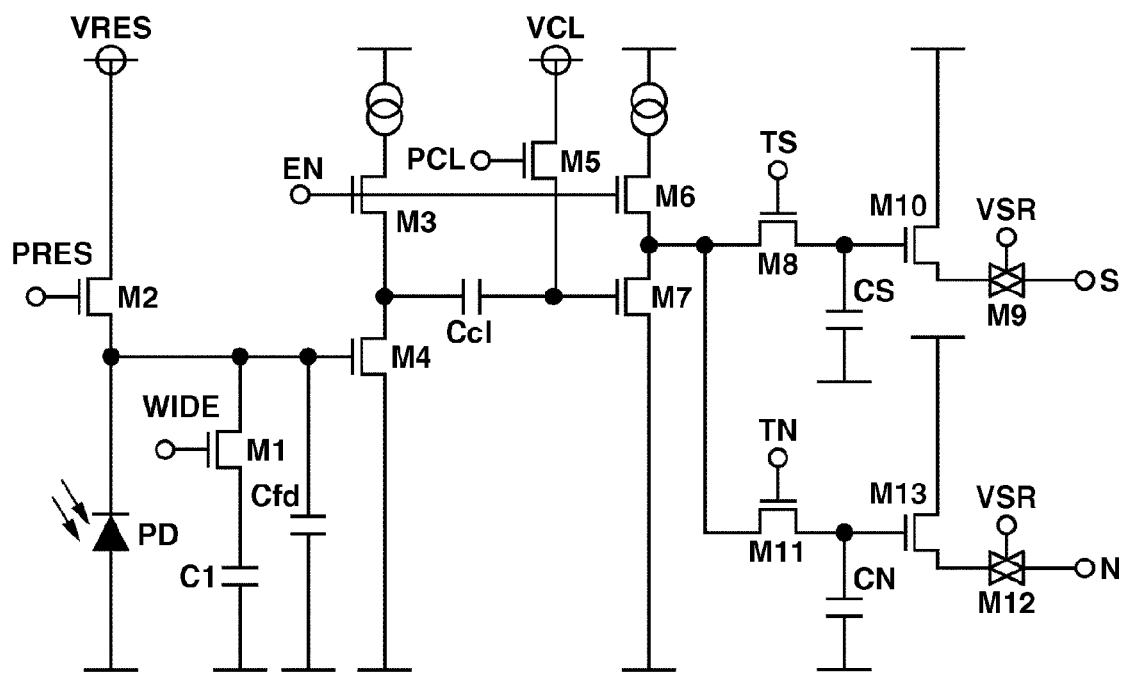
FIG. 1 illustrates an example of a pixel circuit for one pixel in pixel circuits two-dimensionally configured on a CMOS type rectangular semiconductor substrate used in general tiling.

FIG. 1 illustrates an example of a pixel circuit for one pixel in pixel circuits two-dimensionally configured on a CMOS type rectangular semiconductor substrate used in general tiling.

Referring to FIG. 1, a photodiode (PD) performs photoelectric conversion. A reset metal-oxide semiconductor (MOS) transistor M2 (a reset switch) is used to discharge charges accumulated in a floating diffusion (a floating diffusion area). A capacity Cfd is a capacity of the floating diffusion in which charges are accumulated.

A sensitivity switching MOS transistor M1 (a sensitivity changeover switch) is used to switch the sensitivity between a high dynamic range mode and a high sensitivity mode. A capacity C1 is used to expand a dynamic range, and turning on the sensitivity changeover switch M1 allows charges to be accumulated. Turning on the sensitivity changeover switch M1 substantially increases the capacity of a floating node portion, and can expand the dynamic range although the sensitivity reduces. Therefore, for example, the sensitivity changeover switch (M1) is turned off during X-ray radioscopic imaging that needs high sensitivity, and is turned on during, for example, digital subtraction angiography (DSA) imaging that needs a high dynamic range.

An amplification MOS transistor M4 (a pixel amplifier 1) operates as a source follower. A selection MOS transistor M3 (a selection switch 1) is used to set the pixel amplifier 1 (M4) into an operating state. A clamp circuit, which removes a kTC noise generated at a photoelectric conversion portion, is disposed at a rear stage of the pixel amplifier 1 (M4). A capacity Cc1 is a clamp capacity, and a transistor M5 is a clamp MOS transistor (a clamp switch).

An amplification MOS transistor M7 (a pixel amplifier 2) operates as a source follower. A selection MOS transistor M6 (a selection switch 2) is used to set the pixel amplifier 2 (M7) in an operating state. Two sample-hold circuits are disposed at a rear stage of the pixel amplifier 2 (M7). A sample-hold MOS transistor M8 (a sample-hold switch S) constitutes a sample-hold circuit for accumulating optical signals. A capacity CS is an optical signal holding capacity. A sample-hold MOS transistor M11 (a sample-hold switch N) constitutes a sample-hold circuit for accumulating noise signals. A capacity CN is a noise signal holding capacity. An amplification MOS transistor M10 (a pixel amplifier S) operates as a source follower, and amplifies an optical signal. An analog switch M9 (a transmission switch S) is used to output an optical signal amplified by the pixel amplifier S (M10) to an S signal output line. An amplification MOS transistor M13 (a pixel amplifier N) operates as a source follower, and amplifies a noise signal.

An analog switch M12 (a transmission switch N) is used to output a noise signal amplified by the pixel amplifier N (M13) to an N signal output line.

An EN signal is a control signal input to gates of the selection switch 1 (M3) and the selection switch 2 (M6) to set the pixel amplifier 1 (M4) and the pixel amplifier 2 (M7) into an operating state. When the EN signal is at the high level, the pixel amplifier 1 (M4) and the pixel amplifier 2 (M7) are set into an operating state simultaneously.

A WIDE signal is input to a gate of the sensitivity changeover switch (M1), and controls switching of the sensitivity. When the WIDE signal is at the low level, the sensitivity changeover switch (M1) is turned off, and the sensitivity is set to the high sensitivity mode.

A PRES signal is a reset signal that turns on the reset switch M2 to discharge charges accumulated in the photodiode PD.

A PCL signal is a signal that controls the clamp switch M5. When the PCL signal is at the high level, the clamp switch M5 is turned on, and the clamp capacity Cc1 is set to a reference voltage VCL.

A TS signal is a signal that controls sampling and holding of an optical signal. Setting the TS signal to the high level and turning on the sample-hold switch S (M8) causes optical signals to be collectively transferred to the capacity CS via the pixel amplifier 2 (M7). Then, setting the TS signal to the low level and turning off the sample-hold switch S (M8) for all pixels collectively completes holding of optical signal charges in the sample-hold circuit.

A TN signal is a signal that controls sampling and holding of a noise signal. Setting the TN signal to the high level and turning on the sample-hold switch N (M11) causes noise signals to be collectively transferred to the capacity CN via the pixel amplifier 2 (M7). Then, setting the TN signal to the low level and turning off the sample-hold switch N (M11) for all pixels collectively complete holding of noise signal charges in the sample-hold circuit.

After sampling and holding of the capacity CS and the capacity CN, the sample-hold switch S (M8) and the sample-hold switch N (M11) are turned off. As a result, the capacity CS and the capacity CN are disconnected from the accumulation circuit at the front stage, whereby the accumulated optical signals can be read out without destruction until signals are sampled and held again.

Figure 2:
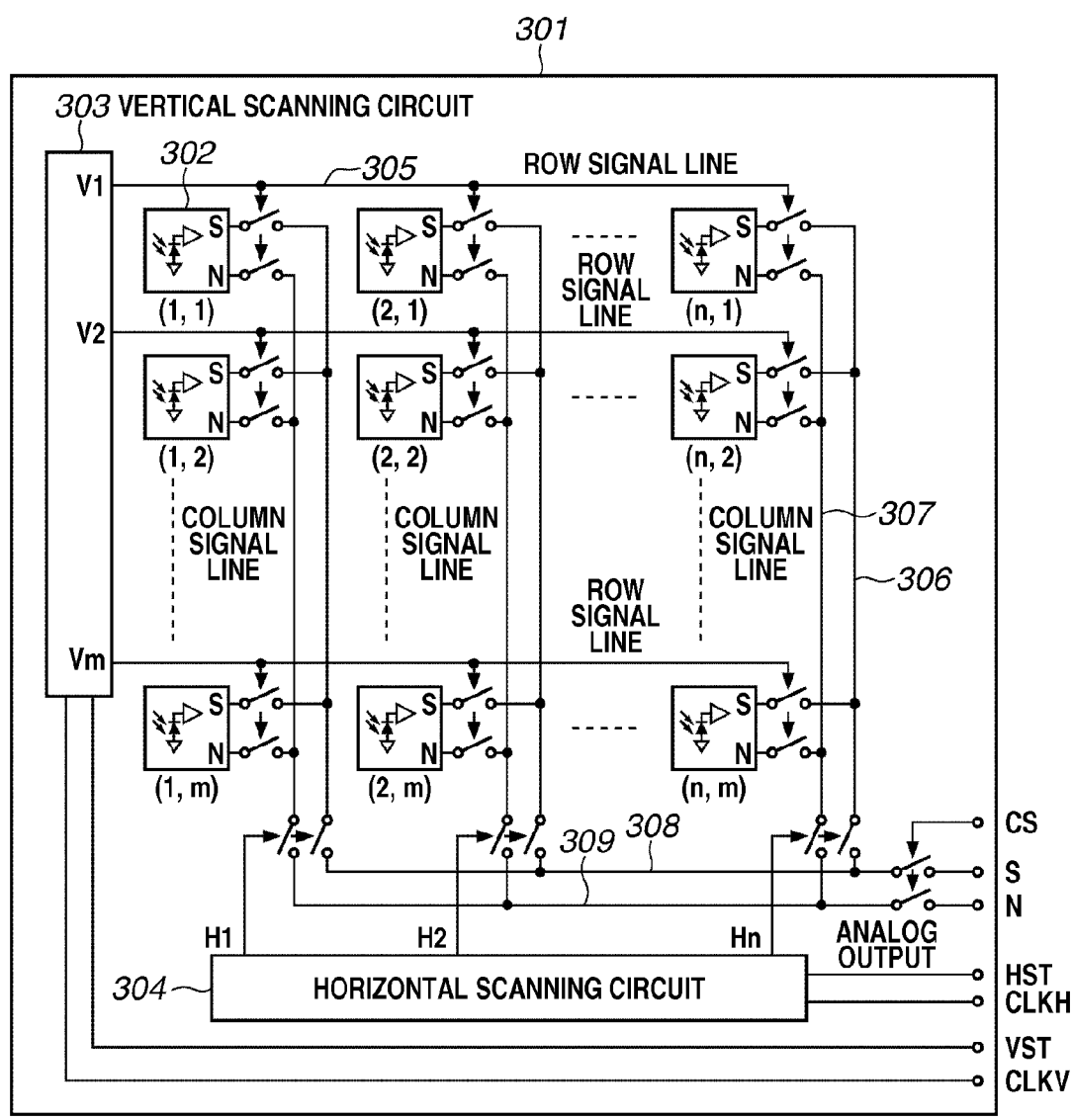
FIG. 2 schematically illustrates an example of an internal configuration of the generally-used CMOS type rectangular semiconductor substrate.

FIG. 2 schematically illustrates an example of an internal configuration of a generally-used CMOS type rectangular semiconductor substrate.

Referring to FIG. 2, a rectangular semiconductor substrate 301 includes a chip selection terminal CS, an optical signal output terminal S, a noise signal output terminal N, a vertical scanning circuit start signal terminal VST, a vertical scanning circuit clock terminal CLKV, a horizontal scanning circuit start signal terminal HST, and a horizontal scanning circuit clock terminal CLKH.

A vertical scanning circuit 303 selects a pixel group in a horizontal direction (a main scanning direction), and sequentially scans the pixel group in a vertical direction, which is a sub-scanning direction, via a row signal line 305 in synchronization with a vertical scanning clock input from the vertical scanning clock terminal CLKV.

A horizontal scanning circuit 304 sequentially selects one pixel at a time from the pixel group in the horizontal direction, i.e., the main scanning direction, which is selected by the vertical scanning circuit 303, via column signal lines 306 and 307 in synchronization with a horizontal scanning clock input from the horizontal scanning clock terminal CLKH.

A pixel 302 includes the pixel circuit illustrated in FIG. 1. Enabling the row signal line 305, which is an output line of the vertical scanning circuit 303, causes the pixel 302 to output a sampled and held optical signal S (a voltage signal) and noise signal N (a voltage signal) to the column signal lines 306 and 307. The horizontal scanning circuit 304 sequentially selects each voltage signal output to the column signal lines 306 and 307, by which the voltage signals of each pixel 302 are sequentially output to analog output lines 308 and 309.

In this manner, in the rectangular semiconductor substrate 301, the pixels 302 are selected by a switching operation according to an XY address method using the vertical scanning circuit 303 and the horizontal scanning circuit 304, and the voltage signals of the optical signal S and the noise signal N of each pixel, which are amplified by the transistors, are output to the analog output terminals S and N via the column signal lines 306 and 307 and the analog output lines 308 and 309. The terminal CS is a chip selection signal input terminal. Turning on the terminal CS causes the optical signal S and the noise signal N of the image sensor according to the internal scanning to be output from the analog output terminals S and N.

At a rear stage of the sample-hold circuit, there are the S signal output changeover analog switch (the transmission switch S), the N signal output changeover analog switch (the transmission switch N), the column signal lines 306 and 307, which are transmission paths of the optical signal S and the noise signal N, and a switching transistor that switches the column signal lines according to an output of the horizontal scanning circuit 304. A transmission circuit of reading scanning is constituted by them.

The terminal CLKV is a clock terminal of the vertical scanning circuit 303, and the terminal VST is a start signal terminal of the vertical scanning circuit 303. Row selection signals of row signal lines V1, V2, . . . Vm are sequentially switched to an enabled state by inputting a clock signal from the vertical scanning circuit clock terminal CLKV after setting the vertical scanning circuit start signal terminal VST high. After vertical scanning starts, the vertical scanning circuit start signal terminal VST is set low.

The terminal CLKH is a clock terminal of the horizontal scanning circuit 304, and the terminal HST is a start signal terminal of the horizontal scanning circuit 304. Column selection signals of H1, H2, . . . Hn are sequentially switched to an enabled state by inputting a clock signal from the horizontal scanning circuit clock terminal CLKH after setting the horizontal scanning circuit start signal terminal HST high. After the horizontal scanning starts, the horizontal scanning circuit start signal terminal HST is set low.

When the output of the row signal line V1 of the vertical scanning circuit 303 is enabled, a pixel group (1, 1) to (n, 1) in a single horizontal row connected to the row signal line V1 is selected, and the S voltage signals and the N voltage signals are output from the respective pixels in the single horizontal row to the respective column signal lines 306 and 307. Then, the S voltage signals and the N voltage signals of the pixels 302 in the single horizontal row are sequentially output to the analog output terminals S and N via the analog output lines 308 and 309 by sequentially switching enabling of the column selection signal to H1, H2, . . . Hn in the horizontal scanning circuit 304. Pixel outputs of all pixels can be acquired by performing similar horizontal scanning to the row signal line Vm.

Generally, an imaging apparatus has several imaging apparatus states from the viewpoint of, for example, the lifetime of the apparatus and energy saving design. Examples of the imaging apparatus states include, for example, a power saving state in which power is supplied to only a part of a digital circuit system and an analog circuit system, and an imaging ready state in which power is supplied to the respective circuit blocks including a sensor. A shift to these imaging apparatus states is performed according to a user's instruction, and is realized by command communication from a command communication control apparatus.

Further, an imaging mode is set to acquire a desired image. Examples of parameters for setting the imaging mode include, for example, a pixel sensitivity setting, a setting for the number of times of non-destructive reading, an analog binning setting, a digital binning setting, a reading area size setting, and an accumulation time setting. Similarly, these imaging mode settings are selected according to a user's instruction, and are realized by command communication from the command communication control apparatus.

Figure 3:
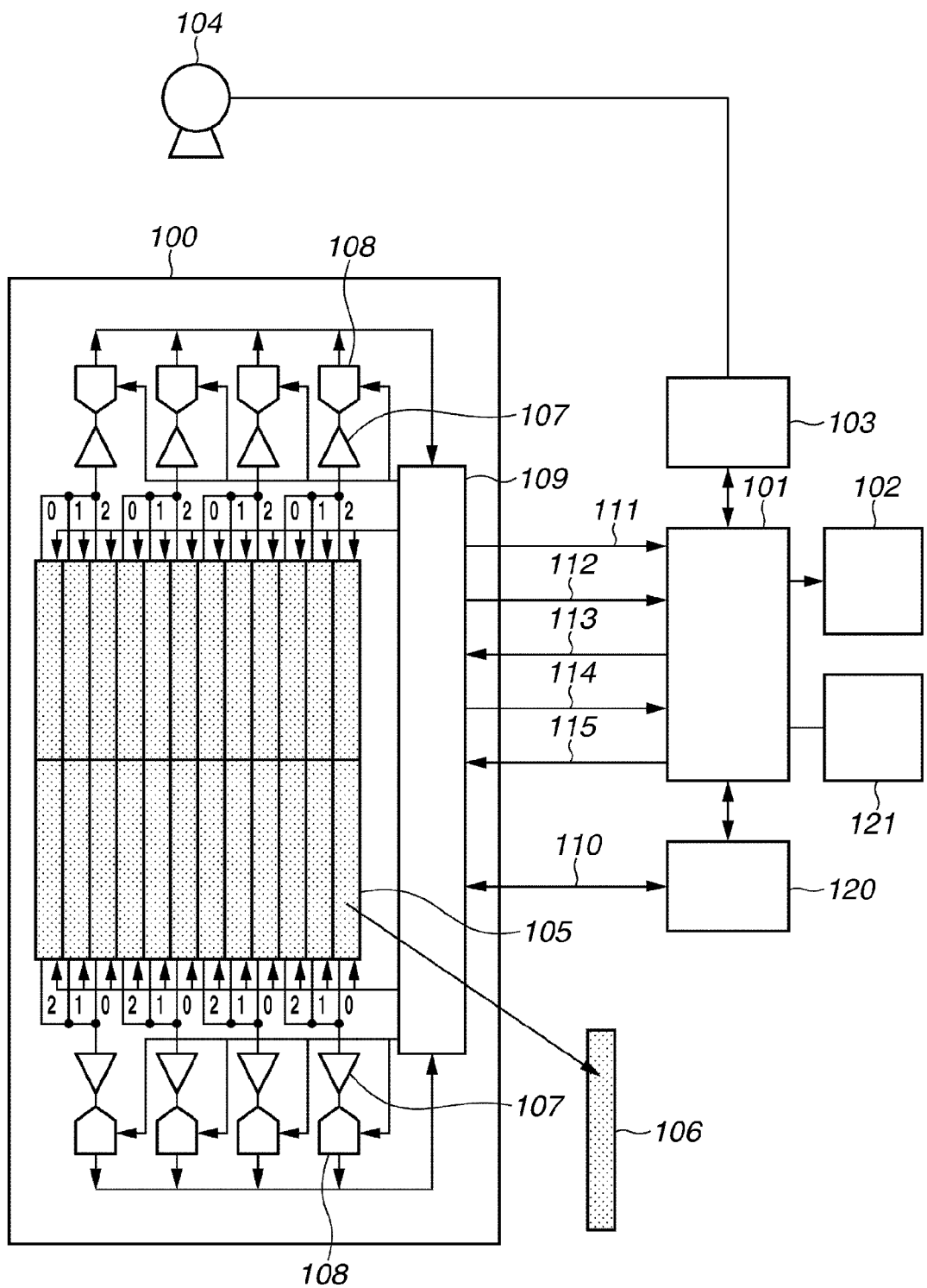
FIG. 3 schematically illustrates an example of an outline of the configuration of a radiation imaging system (an X-ray imaging system) according to a first exemplary embodiment.

FIG. 3 schematically illustrates an example of an outline of a configuration of a radiation imaging system (an X-ray imaging system) according to the first exemplary embodiment. The radiation imaging system illustrated in FIG. 3 is a large-area flat panel type imaging system, and a system including a radiation imaging apparatus for imaging (image-capturing) a radiation moving image.

Referring to FIG. 3, the radiation imaging system includes a radiation imaging apparatus (an X-ray imaging apparatus) 100, an image processing apparatus and system control apparatus 101, an image display apparatus 102, a radiation generation apparatus (an X-ray generation apparatus) 103, a radiation tube (an X-ray tube) 104, a command communication control apparatus 120, and an operation panel 121. An object (not illustrated) is disposed in a space between the radiation tube 104 and the radiation imaging apparatus 100.

At the time of imaging the object (not illustrated), the command communication control apparatus 120 performs various kinds of command communication processes, which will be described below, and further, the radiation imaging apparatus 100 and the radiation generation apparatus 103 are controlled to be synchronized with each other by the image processing apparatus and system control apparatus 101, according to an operator's (user's) operation input to the operation panel 121 such as a touch panel type display.

At the time of imaging, radiation (an X-ray) is emitted from the radiation tube 104 by the radiation generation apparatus 103, and is transmitted through the object (not illustrated). After that, the radiation is incident on the radiation imaging apparatus 100. Then, the radiation incident on the radiation imaging apparatus 100 is converted by a scintillator (not illustrated) into visible light. Then, the radiation imaging apparatus 100 accumulates charges according to the light amount of the visible light as analog electric signals by photoelectric conversion. After that, the radiation imaging apparatus 100 reads out the accumulated charges, and performs analog/digital (A/D) conversion. As a result, radiation image data corresponding to the radiation irradiation is generated. Then, this radiation image data is transferred from the radiation imaging apparatus 100 to the image processing apparatus and system control apparatus 101, and the image processing apparatus and system control apparatus 101 performs image processing on this radiation image data. After that, a radiation image based on the radiation image data subjected to the image processing is displayed on the image display apparatus 102 in real time.

The radiation imaging apparatus 100 includes a rectangular semiconductor substrate 106. This rectangular semiconductor substrate 106 corresponds to, for example, the above-described rectangular semiconductor substrate 301 illustrated in FIG. 2, and has the internal configuration thereof. In other words, the rectangular semiconductor substrate 106 is configured to include an imaging area where pixels including photoelectric conversion elements are two-dimensionally arranged. The radiation imaging apparatus 100 includes a flat panel sensor 105. This flat panel sensor 105 is formed by tiling the rectangular semiconductor substrates 106 in twelve rows and two columns. Further, the flat panel sensor 105 constitutes a radiation detector configured to detect radiation transmitted through the object (not illustrated) as radiation image data. The radiation imaging apparatus 100 performs analog/digital conversion on analog electric signals from the three rectangular semiconductor substrates 106 tiled on the flat panel sensor 105 by a single A/D conversion unit 108 via a single amplification unit 107, thereby acquiring digital electric signals. Then, radiation image data is generated based on the digital electric signals output from the respective A/D conversion units 108.

The radiation imaging apparatus 100 includes an imaging control unit 109. The imaging control unit 109 performs, for example, command communication with the command communication control apparatus 120, imaging control signal communication with the image processing apparatus and system control apparatus 101, and transmission of radiation image data to the image processing apparatus and system control apparatus 101. Further, the imaging control unit 109 also has the function of controlling the flat panel sensor 105. Therefore, the imaging control unit 109 controls driving of the flat panel sensor 105 and the imaging mode, and combines A/D-converted digital image data pieces of respective blocks from the plurality of A/D conversion units 108 in the radiation imaging apparatus 100 into frame radiation image data to transfer the data to the image processing apparatus and system control apparatus 101.

In FIG. 3, using a command communication line 110, the command communication control apparatus 120 sets, for example, a shift to the imaging apparatus state, and various kinds of parameters of the imaging mode for the imaging control unit 109. Further, the imaging control unit 109 notifies the command communication control apparatus 120 of, for example, a response to various kinds of commands and the state of the radiation imaging apparatus 100.

In FIG. 3, using an image data line 111, the radiation image data captured by the radiation imaging apparatus 100 is transmitted from the imaging control unit 109 to the image processing apparatus and system control apparatus 101.

In FIG. 3, a READY signal 112 is a signal by which the imaging control unit 109 notifies the image processing apparatus and system control apparatus 101 that the radiation imaging apparatus 100 has shifted to the imaging ready state.

In FIG. 3, an imaging synchronization signal 113 is a signal by which the image processing apparatus and system control apparatus 101 notifies the imaging control unit 109 of, for example, an imaging timing and a timing for transmission of the radiation image data. The image processing apparatus and system control apparatus 101, which generates the imaging synchronization signal 113 that reports the imaging timing (a signal for synchronizing the radiation imaging apparatus 100 with the radiation generation apparatus 103), corresponds to an imaging communication control unit. Further, the image processing apparatus and system control apparatus 101, which generates the imaging synchronization signal 113 that reports the timing for transmission of the radiation image data, corresponds to an image communication control unit.

FIG. 3 includes an exposure permission signal 114. While this exposure permission signal 114 is enabled, the image processing apparatus and system control apparatus 101 transmits an exposure signal to the radiation generation apparatus 103, and radiation emitted from the radiation tube 104 is stored as effective radiation, as a result of which radiation image data is generated.

FIG. 3 includes an emergency imaging shift signal 115, by which the image processing apparatus and system control apparatus 101 notifies the imaging control unit 109 of a shift to an emergency imaging mode. For example, an operator (a user) inputs an operation regarding a shift to emergency imaging to the operation panel 121, based on which this emergency imaging shift signal 115 is generated. The image processing apparatus and system control apparatus 101 (and the operation panel 121), which generates this emergency imaging shift signal 115, corresponds to an emergency imaging shift unit.

Figure 4:
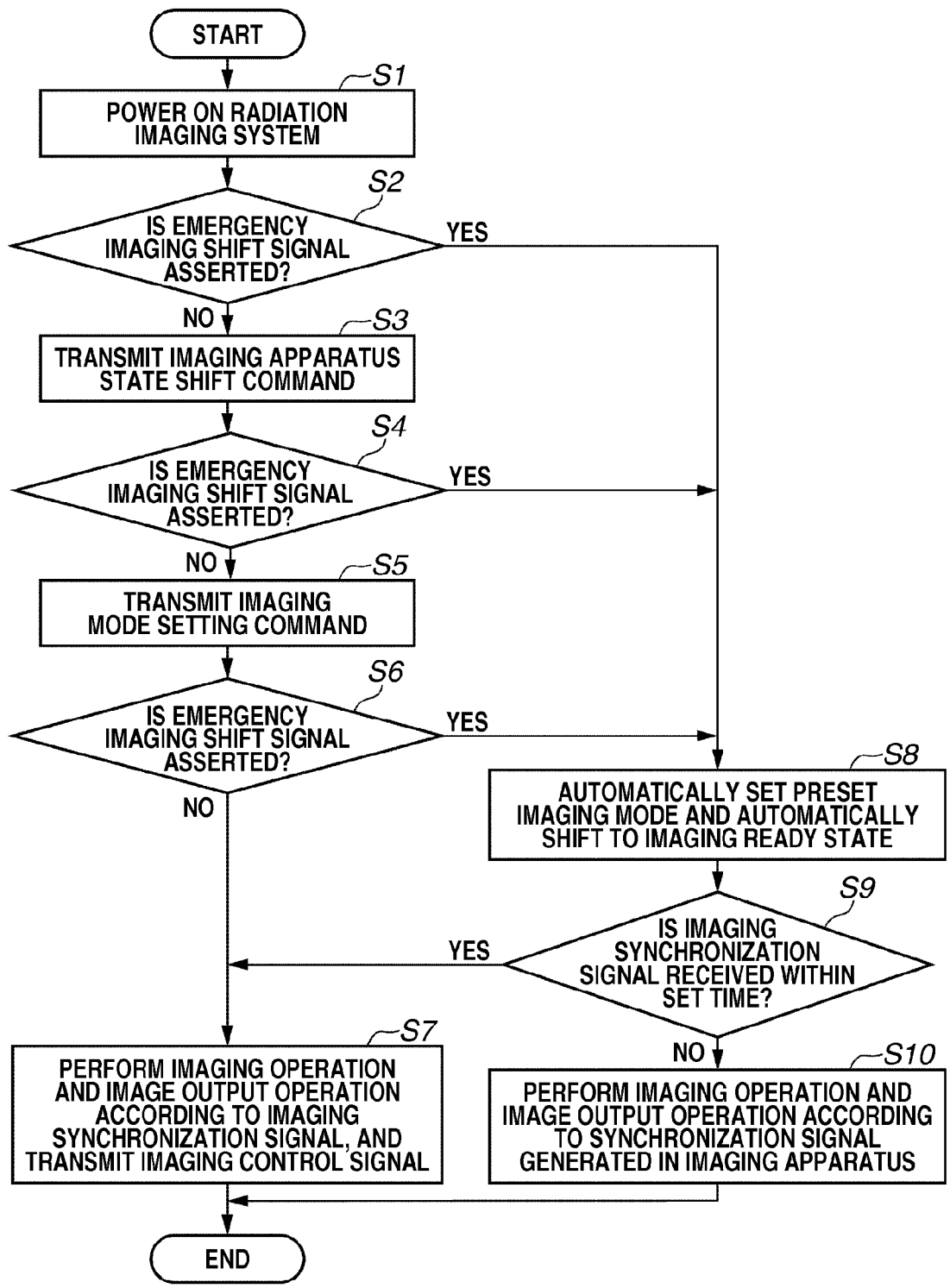
FIG. 4 is a flowchart illustrating an example of a driving control method at the time of imaging in the radiation imaging system (the X-ray imaging system) according to the first exemplary embodiment.

FIG. 4 is a flowchart illustrating an example of a driving control method at the time of imaging by the radiation imaging system (the X-ray imaging system) according to the first exemplary embodiment. More specifically, FIG. 4 illustrates driving control at the time of normal imaging and driving control at the time of emergency imaging.

First, a processing flow of driving control at the time of normal imaging (at the time of imaging in a first mode) will be described. In this case, the emergency imaging shift signal 115 from the image processing apparatus and system control apparatus 101 to the imaging control unit 109 is constantly in a negated state.

In step S1, when an operator (a user) powers on the radiation imaging system, the respective apparatuses in the radiation imaging system are started up. Then, the radiation imaging apparatus 100 establishes the command communication line 110 between the radiation imaging apparatus 100 and the command communication control apparatus 120. This establishment of the command communication line 110 is performed according to the communication specification, and is, for example, a process for establishing a link between communication integrated circuits (ICs) or a process for establishing a port link when an Internet Protocol (IP) address is specified in Ethernet communication.

In step S3, upon the establishment of the command communication line 110, the command communication control apparatus 120 transmits an imaging apparatus state shift command to the radiation imaging apparatus 100 (the imaging control unit 109) for imaging according to an operation input by the operator to the operation panel 121. Then, the radiation imaging apparatus 100 (the imaging control unit 109) receives the imaging apparatus state shift command from the command communication control apparatus 120. The radiation imaging apparatus 100 has several imaging apparatus states such as a sleep state in which analog units are powered off for the purpose of power saving, a ready state in which the analog units are powered on, and an exposure ready state in which the radiation imaging apparatus 100 is ready for imaging by a repetition of sensor reset driving. The imaging apparatus state of the radiation imaging apparatus 100 shifts according to a command from the command communication control apparatus 120.

Subsequently, in step S5, the command communication control apparatus 120 transmits an imaging mode setting command to the radiation imaging apparatus 100 (the imaging control unit 109) according to an operation input by the operator to the operation panel 121. Then, the radiation imaging apparatus 100 (the imaging control unit 109) receives the imaging mode setting command from the command communication control apparatus 120. Examples of parameters regarding the imaging mode setting include, for example, the pixel sensitivity setting, the setting for the number of times of non-destructive reading, the analog binning setting, the digital binning setting, the accumulation time setting, and the reading area size setting. The timing at which the imaging mode setting command is issued is an arbitrary timing or a predetermined timing during the above-described shift of the imaging apparatus state.

After that, in step S7, when the radiation imaging apparatus 100 (the imaging control unit 109) receives the imaging synchronization signal 113 from the external image processing apparatus and system control apparatus 101, the radiation imaging apparatus 100 is triggered by that to perform an imaging operation and an image output operation in the normal imaging mode. At this time, the radiation imaging apparatus 100 (the imaging control unit 109) transmits the exposure permission signal 114 to the image processing apparatus and system control apparatus 101 in synchronization with the imaging operation.

Then, upon the completion of a series of imaging operations, the driving control processing at the time of normal imaging ends.

Next, a processing flow of driving control at the time of emergency imaging (at the time of imaging in a second mode) will be described.

In step S1, the radiation imaging system is powered on. After that, if the emergency imaging shift signal 115 is asserted at some timing (YES in step S2, YES in step S4, or YES in step S6), in step S8, the radiation imaging apparatus 100 automatically sets a preset imaging mode, and automatically shifts to the imaging ready state. Examples of parameters regarding the preset imaging mode include, for example, the pixel sensitivity setting, the setting for the number of times of non-destructive reading, the analog binning setting, the digital binning setting, the accumulation time setting, and the reading area size setting in a similar manner to the parameters at the time of normal imaging. In other words, the parameters regarding the preset imaging mode are automatically set as the parameters regarding the emergency imaging mode. At this time, the automatically set parameters regarding the emergency imaging mode are recorded in, for example, a non-volatile memory (not illustrated), which is a recording unit in the radiation imaging apparatus 100. The automatically set parameters regarding the emergency imaging mode may be recorded when the radiation imaging apparatus 100 is shipped from a factory, or may be arbitrarily recorded, for example, when the radiation imaging apparatus 100 is installed. Alternatively, the parameters regarding the imaging mode in which immediately preceding imaging was performed may be recorded, and may be reflected as the parameters regarding the imaging mode at the time of emergency imaging. In this case, the parameters regarding the imaging mode at the time of emergency imaging are automatically updated every time normal imaging is performed.

Subsequently, in step S9, the radiation imaging apparatus 100 (the imaging control unit 109) determines whether the radiation imaging apparatus 100 has received the imaging synchronization signal 113 from the image processing apparatus and system control apparatus 101 within a preset set time.

If the radiation imaging apparatus 100 has received the imaging synchronization signal 113 within the set time (YES in step S9), the processing proceeds to step S7, in which the radiation imaging apparatus 100 is triggered by the received imaging synchronization signal 113 to perform an imaging operation and an image output operation in the emergency imaging mode.

Further, as an optional setting, if the radiation imaging apparatus 100 has not received the imaging synchronization signal 113 within the set time (NO in step S9), the radiation imaging apparatus 100 is automatically switched to an internal synchronization mode. Then, in step S10, the radiation imaging apparatus 100 performs an imaging operation and an image output operation in the emergency imaging mode based on an imaging apparatus internally generated synchronization signal (a synchronization signal regarding an internal cycle, which is preset for emergency imaging) generated within the radiation imaging apparatus 100. In this case, if radiation irradiation can be realized separately, radiation image data is generated according to the emergency imaging mode setting.

FIG. 4 has been described based on the example in which the radiation imaging apparatus 100 receives the imaging synchronization signal 113 from the image processing apparatus and system control apparatus 101. However, if the radiation imaging system is originally configured in such a manner that the imaging synchronization signal is generated within the radiation imaging apparatus 100, in step S8, the radiation imaging apparatus 100 automatically shifts to the imaging ready state. After that, in step S10, the radiation imaging apparatus 100 performs an imaging operation and an image output operation based on the synchronization signal regarding the cycle preset for emergency imaging.

Next, a second exemplary embodiment of the present invention will be described.

Figure 5:
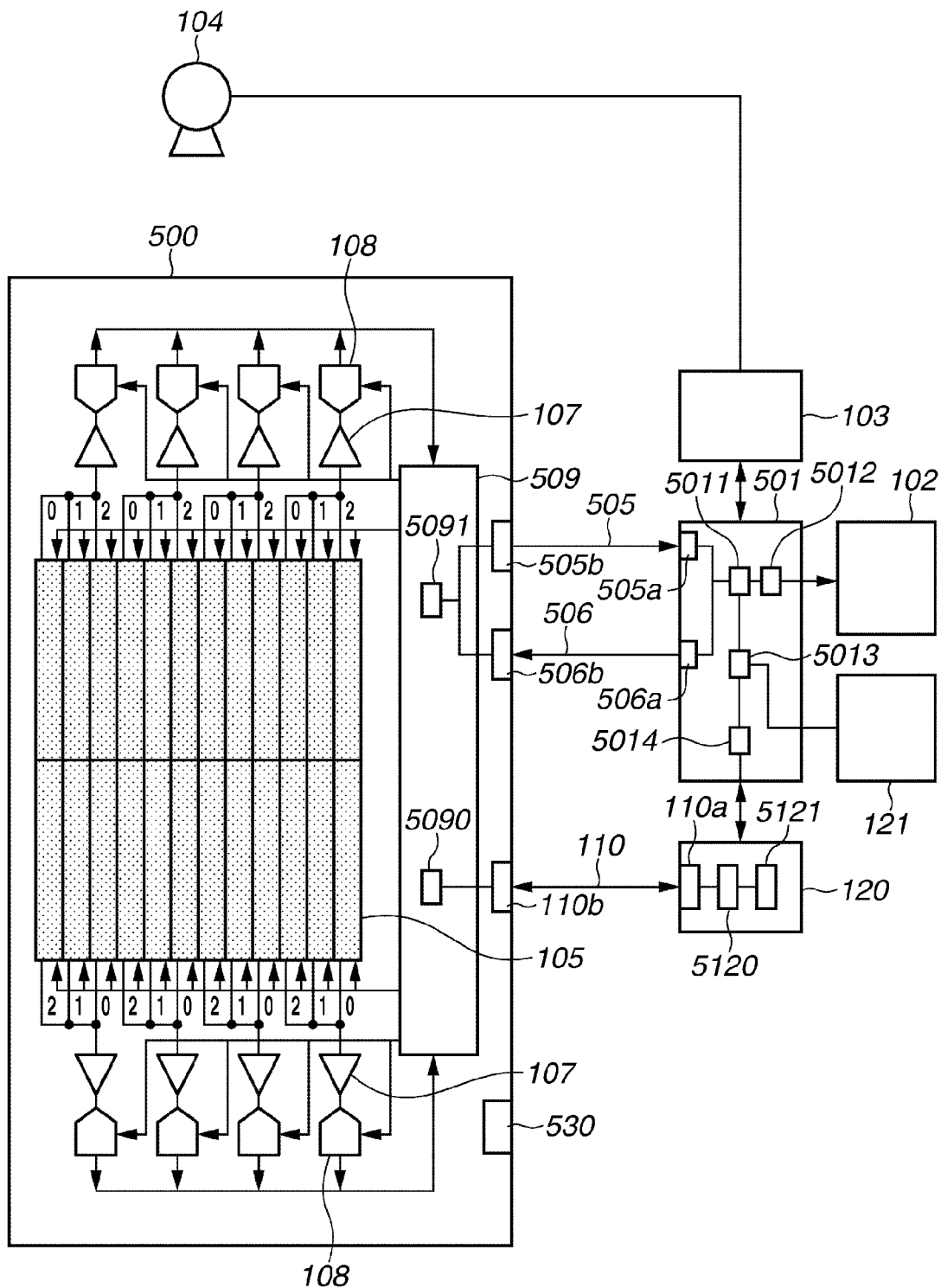
FIG. 5 schematically illustrates an example of an outline of a configuration of a radiation imaging system (an X-ray imaging system) according to a second exemplary embodiment.

FIG. 5 schematically illustrates an example of an outline of a configuration of a radiation imaging system (an X-ray imaging system) according to the second exemplary embodiment. In FIG. 5, similar components to the outlined configuration of the radiation imaging system according to the first exemplary embodiment illustrated in FIG. 3 are denoted by the same reference numerals, and will not be described.

Referring to FIG. 5, the radiation imaging system according to the second exemplary embodiment includes a radiation imaging apparatus (an X-ray imaging apparatus) 500 and an image processing apparatus and system control apparatus 501. Further, the radiation imaging apparatus 500 includes an imaging control unit 509. The image processing apparatus and system control apparatus 501 according to the present exemplary embodiment has a main function similar to the image processing apparatus and system control apparatus 101 according to the first exemplary embodiment. Further, the imaging control unit 509 according to the present exemplary embodiment has a main function similar to the imaging control unit 109 according to the first exemplary embodiment. However, the image processing apparatus and system control apparatus 501 and the imaging control unit 509 communicate with each other in a different manner from the first exemplary embodiment. The system control apparatus 501, the command communication control apparatus 120, the operation panel 121, and the image display apparatus 102 may be collectively referred to as a radiation imaging control apparatus.

The radiation imaging apparatus 500 (the imaging control unit 509) and the command communication control apparatus 120 are connected to each other via an Ethernet cable 110, which corresponds to an Ethernet communication line. The Ethernet cable 110 connects a cable connection portion 110a of the command communication control apparatus 120 and a cable connection portion 110b of the radiation imaging apparatus 500. The communication via the Ethernet cable 110 is performed by a communication circuit 5120 of the command communication control apparatus 120. A control unit 5121 of the command communication control apparatus 120 controls the communication by the communication circuit 5120. In the radiation imaging apparatus 500, the Ethernet communication is performed by a communication circuit 5090, and is controlled by the imaging control unit 509.

The control unit 5121 is realized by, for example, a central processing unit (CPU), an operating system (OS) that works on the CPU such as Windows, and a program that works on this OS. For example, the control unit 5121 causes the communication circuit 5120 to transmit an imaging parameter setting signal, which is a signal for setting an imaging parameter of the radiation imaging apparatus 500, according to an operation input to the operation panel 121. The imaging parameter is at least any one of, for example, the pixel sensitivity setting, the setting for the number of times of nondestructive reading, the analog binning setting, the digital binning setting, the accumulation time setting, and the reading area size setting.

In addition thereto, the radiation imaging apparatus 500 and the system control apparatus 501 are connected to each other via a pair of bidirectional communication lines 505 and 506. This pair of bidirectional communication lines is constituted by, for example, two optical fiber cables 505 and 506 for reception and transmission viewed from the system control apparatus 501. This is because use of optical fibers can realize faster serial communication compared to the Ethernet communication. The optical fiber cable 505 for reception connects a cable connection portion 505*a* of the system control apparatus 501 and a cable connection portion 505*b* of the radiation imaging apparatus 500. The optical fiber cable 506 for transmission connects a cable connection portion 506*a* of the system control apparatus 501 and a cable connection portion 506*b* of the radiation imaging apparatus 500.

Naturally, the above-described optical fiber cables 505 and 506 may be embodied by a single cable collectively, and the connection unit of the radiation imaging apparatus 500 and the connection unit of the system control apparatus 501 may be connected via this single cable.

Further, two pairs or three pairs of optical fiber cables may be used therefor. In this case, the communication can be further sped up.

The serial communication via the optical fiber cables 505 and 506 is performed by the communication circuit 5011 of the system control apparatus 501. The communication by the communication circuit 5011 is controlled by a control unit 5013. In the radiation imaging apparatus 500, the serial communication via the optical fiber cables 505 and 506 is performed by the communication circuit 5091, and is controlled by the imaging control unit 509.

The control unit 5013 is realized by, for example, a CPU, an OS that works on the CPU such as a real-time OS based on Linux (registered trademark), and a program that works on this OS. The control unit 5013 causes a radiation moving image received by the communication circuit 5011 via, for example, the optical fiber cable 506 to be output to an image processing unit 5012. Use of the real-time OS can realize highly reliable control.

Further, the control unit 5013 causes the communication circuit 5011 to transmit an emergency mode signal for setting the above-described imaging parameter to a predetermined setting, to the radiation imaging apparatus 500. The predetermined setting is a setting determined as the imaging mode for emergency, and is, for example, a setting stored in a storage unit of the imaging control unit 509.

Further, as described above, the control unit 5013 causes the communication circuit 5011 to transmit and receive a synchronization signal for synchronizing radiation generation by the radiation generation apparatus 103 with driving of the radiation imaging apparatus 500. For example, the communication unit 5011 transmits a signal for reporting a radiation generation timing to the radiation imaging apparatus 500.

The image processing unit 5012 performs image processing such as noise reduction processing, recursive processing, irradiated field extraction processing, and gradation processing on X-ray moving image data. The control unit 5013 outputs the X-ray moving image data, which has been subjected to the image processing, to the image display apparatus 102, thereby causing the processed data to be displayed as an X-ray moving image.

As a result, even if a failure occurs in the command communication control apparatus 120, or even if a failure occurs in the communication via the Ethernet communication cable 110, the radiation imaging apparatus 500 can perform an imagine operation using the bidirectional serial communication.

A graphical user interface (GUI), which receives an operation input for setting the imaging parameter, is displayed on the operation panel 121. The GUI is displayed under control of, for example, the system control unit 501. The imaging parameter is set by the operation input, and the imaging parameter setting signal corresponding to the set imaging parameter is transmitted via the Ethernet communication cable 110.

In addition, a GUI, which receives an operation input for triggering transmission of the emergency mode signal, is displayed. The method for receiving such an operation input is not limited to the display of the GUI, and may be realized by providing a special button. In this case, it is possible to reduce the risk of an error in pressing, compared to the GUI.

In other words, an image signal and an imaging control signal from the radiation imaging apparatus 500 to the image processing apparatus and system control apparatus 501 are converted into serial signals, and are communicated (transmitted) via the communication line 505. On the other hand, an imaging control signal from the image processing apparatus and system control apparatus 501 to the radiation imaging apparatus 500 is converted into a serial signal, and is communicated (transmitted) via the communication line 506. At this time, according to the present exemplary embodiment, the emergency imaging shift signal 115 in the first exemplary embodiment is a part of the serial signal communicated (transmitted) via the communication line 506. The present exemplary embodiment performs communication using a serial signal, but may perform communication using, for example, a parallel signal.

According to the second exemplary embodiment, upon the shift to the emergency imaging mode (after the emergency imaging shift signal 115 is asserted), the radiation imaging apparatus 500 automatically sets the emergency imaging mode and automatically shifts to the imaging ready state in step S8 illustrated in FIG. 4, in a similar manner to the first exemplary embodiment.

As illustrated in FIG. 5, the radiation imaging system may be configured in such a manner that the radiation imaging apparatus 500 includes an emergency imaging shift button 530. In other words, the radiation imaging system may be configured in such a manner that the emergency imaging shift button 530 is provided so as to be able to be operated from the radiation imaging apparatus 500. In this case, operator's (user's) pressing the emergency imaging shift button 530 can cause the radiation imaging apparatus 500 to automatically set the emergency imaging mode and automatically shift to the imaging ready state in step S8 illustrated in FIG. 4 without requiring an operation to be input to the operation panel 121.

The command communication control apparatus 120 in the above-described first and second exemplary embodiments is often constructed based on a Windows personal computer, and therefore may take a longtime to be started up and may relatively easily go down.

According to the respective exemplary embodiments of the present invention, even when a sudden imaging request is issued, or even when the command communication control apparatus 120 is not started up or has gone down, inputting an operation regarding a shift to emergency imaging to the operation panel 121 or operating the emergency imaging shift button 530 can cause the radiation imaging apparatus 500 to perform an imaging operation in a specific mode without requiring command communication for, for example, shifting the imaging apparatus state and setting the imaging mode.

According to the second exemplary embodiment of the present invention, the system control apparatus 501 can even trigger the emergency imaging mode without relying on an operation input to the operation panel 121 or the operation button.

For example, the system control apparatus 501 includes a state determination unit 5014 configured to determine the state of the command communication control apparatus 120, and the state determination unit 5014 is electrically connected to the control unit 5013. This state determination unit 5014 monitors a state signal periodically transmitted from the command communication control apparatus 120. This state signal is a signal that, for example, the control unit 5121 transmits to the system control apparatus 501 every ten seconds when it is determined that the command communication control apparatus 120 is in a state allowing transmission of an imaging parameter setting signal and there is no abnormality in the OS and other functions in the command communication control apparatus 120.

If the state determination unit 5014 determines that the system control apparatus 501 can receive the state signal at a predetermined time interval, the state determination unit 5014 determines that there is no abnormality in the command communication control apparatus 120. In this case, the state determination unit 5014 does not transmit a signal to the control unit 5013, or outputs a signal indicating no abnormality. In this case, the control unit 5013 does not trigger the radiation imaging apparatus 500 to shift to the emergency imaging mode, and also does not cause the communication circuit 5011 to transmit the emergency mode signal.

On the other hand, if abnormality occurs in the OS of the command communication control apparatus 120, abnormality occurs in the communication with the system control apparatus 501, abnormality occurs in the communication via the Ethernet communication cable 110, or abnormality occurs in the communication circuit 5090 of the radiation imaging apparatus 500, the above-described periodic communication stops.

If the system control apparatus 501 cannot receive the state signal at the predetermined time interval, for example, the state signal is transmitted every fifteen seconds or the system control apparatus 501 cannot receive the state signal at all from a certain point of time, the state determination unit 5014 determines that there is abnormality in the command communication control apparatus 120. Then, if the state determination unit 5014 makes this determination, the state determination unit 5014 outputs a signal to the control unit 5013 so that the emergency mode signal is transmitted to the radiation imaging apparatus 500. Upon reception this signal, the control unit 5013 controls the communication circuit 5011 so as to transmit the emergency mode signal.

As a result, if the command communication control apparatus 120 cannot operate normally due to, for example, abnormality in the OS of the command communication control apparatus 120, abnormality in the communication with the system control apparatus 501, abnormality in the communication via the Ethernet communication cable 110, or abnormality in the communication circuit 5090 of the radiation imaging apparatus 500, the radiation imaging apparatus 500 automatically shifts to the emergency imaging mode, whereby a user does not have to determine whether there is abnormality in the command communication control apparatus 120 by himself/herself, thereby improving the usability.

If the state determination unit 5014 determines that there is abnormality at this time, the control unit 5013 controls the operation panel 121 so as to display a GUI for receiving an operation input indicating a user's decision about whether to transmit the emergency mode signal. If the user inputs an operation indicating transmission at this time, the control unit 5013 determines to transmit the emergency mode signal, and causes the communication circuit 5011 to transmit the emergency mode signal as described above. If the user inputs an operation indicating no transmission at this time, the control unit 5013 determines not to transmit the emergency mode signal, and does not cause the communication circuit 5011 to transmit the emergency mode signal. Leaving the final decision to the user in this manner can further enhance the reliability of the system.

The above-described state determination unit 5014 determines normality or abnormality using the interval at which the state signal is periodically received. However, the method for determining normality or abnormality is not limited thereto. For example, the command communication control apparatus 120 may transmit a signal indicating its state to the system control apparatus 501 when a change occurs in the state of the command communication control apparatus 120 or at the timing of occurrence of abnormality, and the state determination unit 5014 may determine the state of the command communication control apparatus 120 based on this signal. In this case, abnormality can be detected in real time, except when a failure occurs in the function of the command communication control apparatus 120 for transmitting the state signal. Further, as another exemplary embodiment, the state determination unit 5014 may use a combination of the periodic transmission of the signal and the transmission of the signal at the timing of occurrence of abnormality, by which abnormality can be further appropriately detected.

Further, the state determination unit 5014 may determine any one or more situations among the above-described abnormal situations, instead of determining all of the above-described various kinds of abnormal situations.

Further, the above-described exemplary embodiment may have the following feature in addition to the above-described features. In some cases, when the radiation imaging apparatus 500 captures a radiation moving image in the above-described emergency mode, this imaging may be performed in a different imaging mode from the imaging mode that should be employed if this is a normal case. Examples thereof include such a situation that the radiation imaging apparatus 500 often uses a relatively high frame rate such as 60 fps for an internal organ that moves actively such as a heart compared to a normal frame rate of 30 fps, but the radiation imaging apparatus 500 uses 30 fps even for such an internal organ due to the setting of the emergency imaging mode. The control unit 5013 determines whether the information about an imaging target portion and an imaging method requested from a radiation information system (RIS) corresponds to the imaging conditions of the emergency imaging mode. If the control unit 5013 determines that there is no correspondence therebetween, the control unit 5013 associates information indicating the emergency mode with the moving image acquired from the radiation imaging apparatus 500, and stores the associated information in the storage unit. Examples of this information indicating the emergency mode include, for example, setting 1 to flag information which has possible values 0 and 1 to indicate the emergency mode, an addition of characters "EMERGENCY MODE" as a text comment, and information indicating that the requested imaging target portion and imaging method do not correspond to the actually-used imaging parameters. If the control unit 5013 stores an X-ray moving image provided with any one of them or a combination of them, the control unit 5013 associates it with the X-ray moving image, and stores them in the storage unit of the system control apparatus 501, or an external image storage and a communication system (Picture Archiving and Communication Systems (PACS)).

In the above-described example, an X-ray moving image is captured or displayed, but a still image may be handled.

In the above-described example, the control unit 5013 of the system control apparatus 501 and the control unit 5121 of the command communication control apparatus 120 each are realized by one or more CPU, OS, and software program that works on the OS. However, the control units 5013 and 5121 are not limited thereto, and each may be realized by a dedicated hardware chip set. In this case, one possible method therefor is to implement a program for realizing the above-described functions on hardware as it is by, for example, Field-Programming Gate Array (FPGA). Further, the above-described state determination unit 5014 and image processing unit 5012 may be also realized by software or hardware.

According to the above-described exemplary embodiment, even when imaging is requested suddenly, or even when the command communication control apparatus 120 is not started up or has gone down, an imaging operation can be realized in the specific mode.

In recent years, the need to deal with various imaging environments has led to increases in the number of items that constitute imaging conditions of imaging apparatuses and the number of choices settable in each item, whereby the number of imaging modes has tended to increase. Therefore, it has been becoming impossible to store or hold correction data for all imaging modes due to the constraint from the memory capacity storable in the imaging apparatuses. On the other hand, in a system in which an imaging apparatus is incorporated, the imaging apparatus may not use all imaging modes actually in some cases since the imaging apparatus selects an imaging condition according to an imaging target or an environment, or correction processing may not be requested to the imaging apparatus side in some cases since the system side including the imaging apparatus performs the correction function. In other words, the imaging apparatuses do not necessarily have to hold correction data for each of the all imaging modes, and there is a demand for an imaging apparatus capable of dealing with various requests from a system flexibly and widely.

Therefore, a third exemplary embodiment relates to an imaging apparatus capable of dealing with various requests from a system without being affected by a use restriction due to the storage capacity of a memory, and this third exemplary embodiment will be described below.

FIG. 6 illustrates an example of a structure of a table defining imaging modes in which the radiation imaging apparatus 500 can perform processing for correcting image data, and an example of a structure of a table storing correction data corresponding to each imaging mode in which the radiation imaging apparatus 500 can perform the processing for correcting image data according to the third exemplary embodiment. According to the present exemplary embodiment, the radiation imaging apparatus 500 can capture an image of an object while switching binning (1×1, 2×2, 4×4), a gain (Low, Middle, High), and an accumulation time (8.3, 33, 66 [ms]) as imaging conditions. In other words, as illustrated in a table 201, the radiation imaging apparatus 500 has imaging modes corresponding to twenty-seven types of imaging conditions, which are combinations of three types of binning, three types of gains, and three types of accumulation times. In the table 201, imaging modes with a circle written in an item field "CORRECTION USABLE" are imaging modes in which the radiation imaging apparatus 500 can perform the processing for correcting image data. On the other hand, in the table 201, imaging modes with the item field "CORRECTION USABLE" left blank are imaging modes executable only when the radiation imaging apparatus 500 is not supposed to perform the processing for correcting image data. Further, a table 202 is a table storing correction data corresponding to the imaging modes with a circle written in the item field "CORRECTION USABLE" in the table 201, i.e., the imaging modes in which the radiation imaging apparatus 500 can perform the processing for correcting image data. The tables 201 and 202 are stored in a memory built in the radiation imaging apparatus 500. Further, the imaging modes defined in the table 201 as the imaging modes in which the radiation imaging apparatus 500 can perform the processing for correcting image data can be arbitrarily specified by a user within a range in which the correction data of these imaging modes can be stored in the memory. Further, the present exemplary embodiment is described assuming that a dark correction, an offset correction, a gain correction, a defect correction, and the like are performed as the processing for correcting image data. The dark correction is processing for correcting a dark component of the photoelectric conversion device. The offset correction is processing for correcting an offset component of the signal processing circuit portion. The gain correction is processing for correcting a variation in sensitivity of the photoelectric conversion device and a variation in a gain of the signal processing circuit portion. In the gain correction, normally, an X-ray is emitted and imaging is performed without an object before the object is imaged. The captured image data is used as gain correction image data, and is subtracted from image data captured by imaging the object. Further, the defect correction is processing for correcting a pixel value of a defect pixel using pixel values surrounding the defect pixel.

Figure 7:
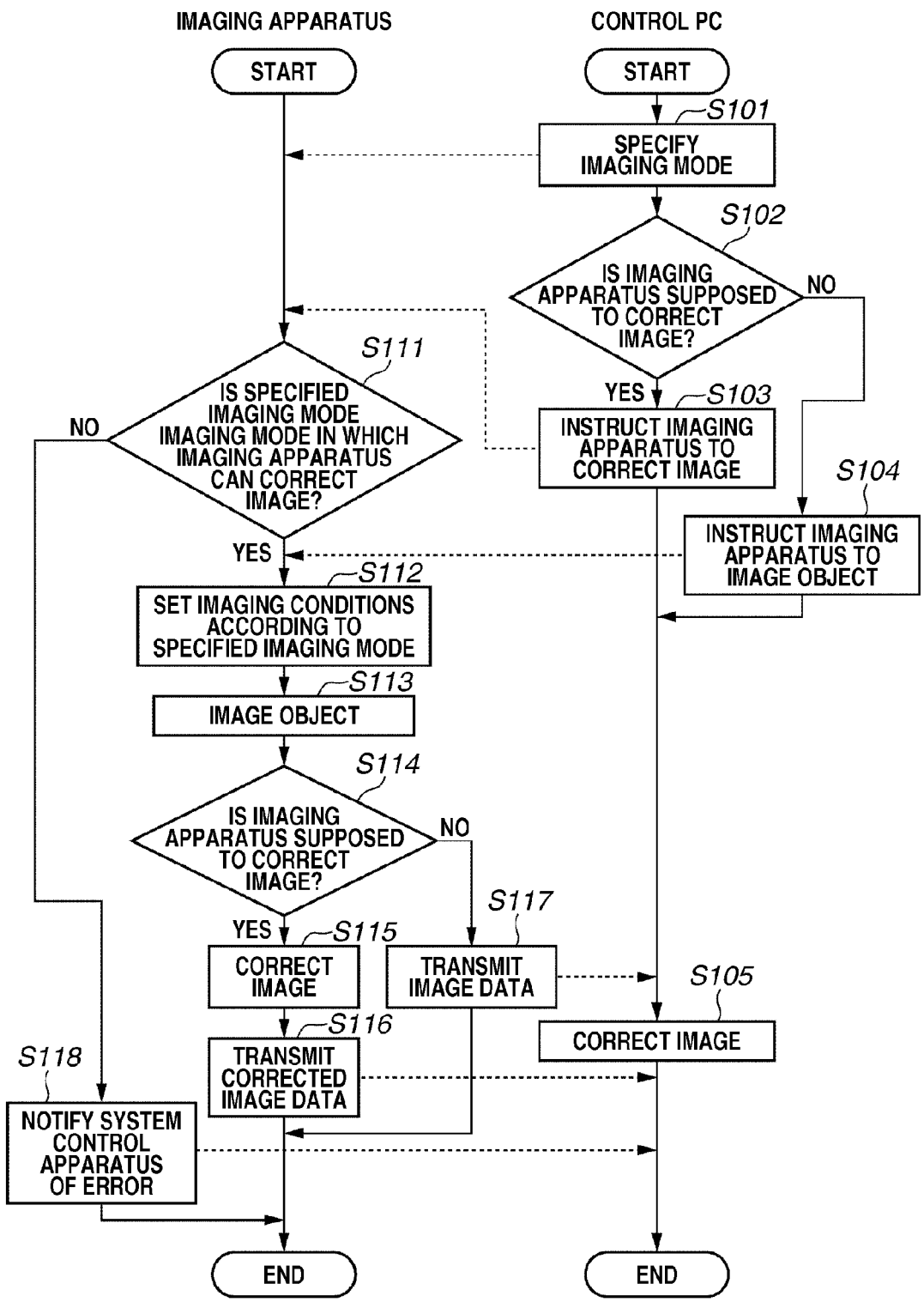
FIG. 7 is a flowchart illustrating a flow of processing by a radiation imaging system according to the third exemplary embodiment.

Next, a flow of processing by a radiation imaging system according to the present exemplary embodiment will be described with reference to FIG. 7. The CPUs built in the system control apparatus 501 and the radiation imaging apparatus 500 read out required programs and data from recording media such as read only memories (ROMs) to random access memories (RAMs) and execute them, respectively, by which the processing illustrated in FIG. 7 is realized.

In step S101, the system control apparatus 501 instructs the radiation imaging apparatus 500 to start imaging, after specifying any of the imaging modes 1 to 27 defined in the table 201 illustrated in FIG. 6. In step S102, the system control apparatus 501 determines whether to cause the radiation imaging apparatus 500 to perform the processing for correcting image data. The system control apparatus 501 determines whether to cause the radiation imaging apparatus 500 to perform the processing for correcting image data according to a user's instruction issued to the system control apparatus 501 or the content of the setting set in advance. If the system control apparatus 501 determines to cause the radiation imaging apparatus 500 to perform the processing for correcting image data (YES in step S102), the processing proceeds to step S103. On the other hand, if the system control apparatus 501 determines not to cause the radiation imaging apparatus 500 to perform the processing for correcting image data (NO in step S102), the processing proceeds to step S104. In step S103, the system control apparatus 501 instructs the radiation imaging apparatus 500 to perform the processing for correcting image data. In step S104, the system control apparatus 501 instructs the radiation imaging apparatus 500 to perform imaging processing.

In step S111, the radiation imaging apparatus 500 determines whether the imaging mode specified in step S101 is an imaging mode in which the radiation imaging apparatus 500 can perform the processing for correcting image data. In other words, in step S111, the radiation imaging apparatus 500 determines whether the imaging mode specified in step S101 is one of the imaging modes with a circle written in the item field "CORRECTION USABLE" in the table 201 illustrated in FIG. 6. If the specified imaging mode is an imaging mode in which the radiation imaging apparatus 500 can perform the processing for correcting image data (YES in step S111), the processing proceeds to step S112. On the other hand, if the specified imaging mode is not an imaging mode in which the radiation imaging apparatus 500 can perform the processing for correcting image data (NO in step S111), the processing proceeds to step S118. In step S118, the radiation imaging apparatus 500 notifies the system control apparatus 501 that the radiation imaging apparatus 500 cannot perform the imaging mode specified in step S101 as an error notification.

In step S112, the radiation imaging apparatus 500 sets the imaging conditions according to the imaging mode specified in step S101. In other words, if the processing proceeds from step S111 to step S112, the radiation imaging apparatus 500 can use only an imaging mode in which the radiation imaging apparatus 500 can perform the processing for correcting image data. On the other hand, if the processing proceeds from step S104 to step S112, no restriction is imposed on use of an imaging mode, and the radiation imaging apparatus 500 can use any of all imaging modes. In step S113, the radiation imaging apparatus 500 captures image data by detecting an X-ray emitted by the X-ray generation apparatus 103 and transmitted through the object.

In step S114, the radiation imaging apparatus 500 determines whether to perform the processing for correcting the captured image data according to a user's instruction issued to the radiation imaging apparatus 500 and the content of the setting set in advance. If the radiation imaging apparatus 500 is supposed to perform the processing for correcting the image data (YES in step S114), the processing proceeds to step S115. On the other hand, if the radiation imaging apparatus 500 is not supposed to perform the processing for correcting the image data (NO in step S114), the processing proceeds to step S117.

In step S115, the radiation imaging apparatus 500 performs the processing for correcting the image data using the correction data (one of offset1 to offset27) for the imaging mode specified in step S101. In step S116, the radiation imaging apparatus 500 transmits the corrected image data to the system control apparatus 501.

In step S117, the radiation imaging apparatus 500 transmits the captured image data to the system control apparatus 501 without correcting it. In step S105, the system control apparatus 501 performs the processing for correcting the image data using the correction data stored in the storage device.

In this manner, according to the present exemplary embodiment, it is possible to specify whether to cause the radiation imaging apparatus 500 to perform the processing for correcting image data. Then, if it is specified that the radiation imaging apparatus 500 should perform the processing for correcting image data, the radiation imaging apparatus 500 is allowed to use only an imaging mode in which the radiation imaging apparatus 500 can perform the processing for correcting image data. If it is specified that the radiation imaging apparatus 500 should not perform the processing for correcting image data, no restriction is imposed on use of an imaging mode. As a result, according to the present exemplary embodiment, it is possible to provide the radiation imaging apparatus 500 capable of dealing with various requests from the system without being affected by the use restriction due to the storage capacity of the memory of the imaging apparatus.

Figure 8:
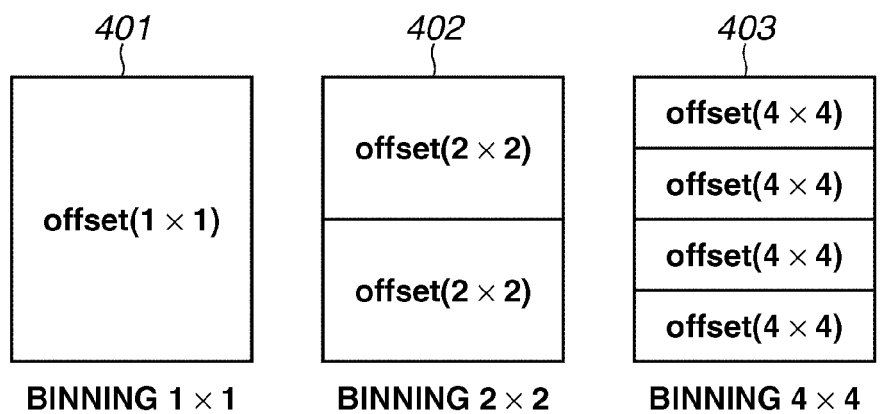
FIG. 8 illustrates a relationship between binning and data amounts of the correction data.

FIG. 8 illustrates a relationship between binning methods and data amounts of correction data. The data amount of correction data is proportional to the number of pixels. Therefore, the data amount of correction data 402 corresponding to 2×2 binning is a half of the data amount of correction data 401 corresponding to 1×1 binning, and the data amount of correction data 403 corresponding to 4×4 binning is one-fourth of the data amount of the correction data 401 corresponding to 1×1 binning.

FIG. 9 illustrates an example of a structure of a table defining imaging modes in which the radiation imaging apparatus 500 can perform the processing for correcting image data, and an example of a structure of a table storing correction data corresponding to each imaging mode in which the radiation imaging apparatus 500 can perform the processing for correcting image data according to the third exemplary embodiment.

In a table 501 illustrated in FIG. 9, some imaging modes circled in the item "CORRECTION USABLE" are changed in consideration of binning, compared to the table 201 illustrated in FIG. 6. More specifically, the imaging modes 1 and 2 of 1×1 binning are removed from the imaging modes in which the radiation imaging apparatus 500 can perform the processing for correcting image data. Instead, the imaging modes 20, 21, 25, and 26 of 4×4 binning are added to the imaging modes in which the radiation imaging apparatus 500 can perform the processing for correcting image data. Nevertheless, the data amount of correction data indicated in a table 502 illustrated in FIG. 9 is equal to the data amount of correction data indicated in the table 202 illustrated in FIG. 6. The memory of the imaging apparatus can be effectively used according to required imaging modes, by taking into consideration a difference in data amounts of correction data based on binning in this manner.

According to the present exemplary embodiment, it is possible to provide the imaging apparatus capable of dealing with various requests from the system without being affected by the use restriction due to the storage capacity of the memory.

The above-described command communication via the Ethernet cable can be also realized by optical serial communication. In this case, it is possible to also improve the certainty of the settings of the various kinds of imaging parameters, thereby further enhancing the reliability of the system.

In the above-described examples, the exemplary embodiments based on the X-ray sensor using the CMOS chip have been described. However, the present invention is not limited thereto, and can be applied to even an X-ray sensor using a sensor based on amorphous silicon (a-Si) or polysilicon (poly-Si).

Examples of applications to which the exemplary embodiments of the present invention can be employed include, for example, angiography such as digital subtraction angiography (DSA), and X-ray radioscopic imaging during a surgery.

Further, the present invention can be also realized by performing the following procedure.

Software (or a program) that performs the processing illustrated in FIG. 4 is supplied to a system or an apparatus via a network or various kinds of storage media, and a computer (or, for example, a CPU or a microprocessor unit (MPU)) of this system or apparatus reads out and executes this program.

This program and a computer-readable storage medium storing this program are included in the scope of the present invention.

All of the above-described exemplary embodiments of the present invention are only examples when actually carrying out the present invention. The technical range of the present invention should not be interpreted in a limited manner by these exemplary embodiments. In other words, the present invention can be embodied in various manners without departing from the technical idea or the main feature of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-164129, filed Jul. 24, 2012, and 2012-169968, filed Jul. 31, 2012, which are hereby incorporated by reference herein in their entirety.

What is claimed is:

1. A radiation imaging control apparatus communicable with a radiation imaging apparatus including a radiation sensor and capable of acquiring a radiation moving image, the radiation imaging control apparatus comprising:
a first communication unit configured to communicate with the radiation imaging apparatus via Ethernet communication;
a second communication unit configured to communicate with the radiation imaging apparatus via at least a pair of bidirectional serial optical communication lines;
a first control unit configured to cause the first communication unit to transmit a first signal for setting at least one parameter among a pixel sensitivity setting, a setting of a number of times of non-destructive reading for one frame of the radiation moving image, an analog binning setting, a digital binning setting, an accumulation time setting, and a reading area size setting to the radiation imaging apparatus;
a second control unit configured to receive data of the radiation moving image from the radiation imaging apparatus via the second communication unit, wherein the received data is to be output to an image processing unit, and configured to cause the second communication unit to transmit a second signal for setting at least one of the pixel sensitivity setting, the setting of the number of times of non-destructive reading for one frame of the radiation moving image, the analog binning setting, the digital binning setting, the accumulation time setting, and the reading area size setting to a predetermined setting, to the radiation imaging apparatus; and
a display unit configured to display the radiation moving image on which image processing is performed by the image processing unit.

2. The radiation imaging control apparatus according to claim 1, wherein the second control unit is configured to cause the second communication unit to transmit and receive a signal for synchronizing a timing at which a radiation generation apparatus generates radiation and a timing at which the radiation imaging apparatus is driven.

3. The radiation imaging control apparatus according to claim 1, wherein the second control unit is configured to cause the second communication unit to transmit a signal for notifying the radiation imaging apparatus of a timing at which a radiation generation apparatus generates radiation, to the radiation imaging apparatus.

4. The radiation imaging control apparatus according to claim 1, further comprising an operation unit configured to receive an operation input for setting the at least one parameter and an operation input for triggering transmission of the second signal.

5. The radiation imaging control apparatus according to claim 1, further comprising a state determination unit configured to determine a state of the Ethernet communication,
wherein the second control unit is configured to cause the second communication unit to transmit the second signal to the radiation imaging apparatus according to a determination result of the state determination unit.

6. The radiation imaging control apparatus according to claim 5, wherein the state determination unit is configured to determine whether communication is established between the first communication unit and at least one of a radiation generation apparatus and the radiation imaging apparatus.

7. The radiation imaging control apparatus according to claim 1, further comprising a state determination unit configured to determine whether communication is established between the first communication unit and at least one of a radiation generation apparatus and the radiation imaging apparatus,
wherein the second control unit is configured to cause the display unit to display a GUI (graphical user interface) for receiving an operation input for determining whether to transmit the second signal according to a determination result of the state determination unit.

8. The radiation imaging control apparatus according to claim 7, wherein the state determination unit determines whether communication is established between the first communication unit and at least one of the radiation generation apparatus and the radiation imaging apparatus.

9. The radiation imaging control apparatus according to claim 1, wherein the second control unit is configured to cause a storage unit to store an image based on the radiation moving image acquired by radiation imaging performed according to the second signal, and configured to associate the radiation moving image with information indicating that the radiation moving image is acquired according to the second signal.

10. The radiation imaging control apparatus according to claim 1, wherein the first control unit is configured to cause the first communication unit to transmit the first signal for setting respective parameters of the pixel sensitivity setting, the setting of the number of times of non-destructive reading, the analog binning setting, the digital binning setting, the accumulation time setting, and the reading area size setting to the radiation imaging apparatus.

11. The radiation imaging control apparatus according to claim 1, further comprising a radiation generation unit.

12. A radiation imaging system comprising:
the radiation imaging control apparatus according to claim 1; and
the radiation imaging apparatus,
wherein the radiation imaging apparatus includes a first connection unit configured to connect the radiation imaging apparatus to the first communication unit via an Ethernet cable, and a second connection unit configured to connect the radiation imaging apparatus to the second communication unit via an optical communication cable.

13. A method for controlling a radiation imaging system including a radiation imaging apparatus having a radiation sensor to acquire a radiation moving image, and a radiation imaging control apparatus, the radiation imaging apparatus and the radiation imaging control apparatus being connected to each other via Ethernet communication and at least a pair of bidirectional serial optical communication lines, the method comprising:
transmitting a first signal for setting at least one parameter among a pixel sensitivity setting, a setting of a number of times of non-destructive reading for one frame of the radiation moving image, an analog binning setting, a digital binning setting, an accumulation time setting, and a reading area size setting from the radiation imaging control apparatus to the radiation imaging apparatus via the Ethernet communication;
receiving data of the radiation moving image from the radiation imaging apparatus, wherein the received data is to be output to an image processing unit;
transmitting a second signal for setting at least one of the pixel sensitivity setting, the setting of the number of times of non-destructive reading for one frame of the radiation moving image, the analog binning setting, the digital binning setting, the accumulation time setting, and the reading area size setting to a predetermined setting, from the radiation imaging control apparatus to the radiation imaging apparatus via the serial optical communication line; and
displaying the data of the radiation moving image transmitted from the radiation imaging apparatus to the radiation imaging control apparatus on a display unit.

14. A radiation imaging control apparatus communicable with a radiation imaging apparatus including a radiation sensor and capable of acquiring a radiation moving image, the radiation imaging control apparatus comprising:
a first communication unit configured to communicate with the radiation imaging apparatus via one Ethernet communication line;
a second communication unit configured to communicate with the radiation imaging apparatus via at least a pair of bidirectional serial optical communication lines, which is different from the Ethernet communication line; and
a controller configured to:
cause the first communication unit to transmit a first signal for setting at least one parameter among a pixel sensitivity setting, a setting of a number of times of non-destructive reading for one frame of the radiation moving image, an analog binning setting, a digital binning setting, an accumulation time setting, and a reading area size setting to the radiation imaging apparatus;
receive data of the radiation moving image from the radiation imaging apparatus using the second communication unit;
cause the second communication unit to transmit a second signal for setting at least one of the pixel sensitivity setting, the setting of the number of times of non-destructive reading for one frame of the radiation moving image, the analog binning setting, the digital binning setting, the accumulation time setting, and the reading area size setting to a predetermined setting, to the radiation imaging apparatus;
apply image processing to the received data to obtain a processed image; and
cause a display unit to display the processed image.

15. The radiation imaging control apparatus according to claim 14, wherein the controller is configured to cause the second communication unit to transmit and receive a signal for synchronizing generating radiation by a radiation generating apparatus and driving of the radiation imaging apparatus.

16. The radiation imaging control apparatus according to claim 14, wherein the controller is configured to cause the second communication unit to transmit a signal, to the radiation imaging apparatus, for notifying the radiation imaging apparatus of a timing at which a radiation generation apparatus generates radiation.

17. The radiation imaging control apparatus according to claim 14, further comprising an operation unit configured to receive an operation input for setting the at least one parameter and an operation input for causing the second signal to be transmitted.

18. The radiation imaging control apparatus according to claim 14, further comprising a state determination unit configured to determine a state of the Ethernet communication line,
wherein the controller is configured to cause the second communication unit to transmit the second signal to the radiation imaging apparatus according to a state of the Ethernet communication line determined by the state determination unit.

19. The radiation imaging control apparatus according to claim 18, wherein the state determination unit is configured to determine whether communication is established between the first communication unit and at least one of a radiation generation apparatus and the radiation imaging apparatus.

20. The radiation imaging control apparatus according to claim 14, further comprising a state determination unit configured to determine whether communication is established between the first communication unit and at least one of a radiation generation apparatus and the radiation imaging apparatus,
wherein the controller is configured to cause the display unit to display, according to the state of the Ethernet communication determined by the state determination unit, a GUI (graphical user interface) for receiving an operation input for determining whether to transmit the second signal.

21. The radiation imaging control apparatus according to claim 20, wherein the state determination unit determines whether communication is established between the first communication unit and at least one of the radiation generation apparatus and the radiation imaging apparatus.

22. The radiation imaging control apparatus according to claim 14, wherein the controller is configured to cause a storage unit to store an image based on the radiation moving image acquired by radiation imaging according to the second signal, and configured to associate the radiation moving image with information indicating that the radiation moving image is acquired according to the second signal.

23. The radiation imaging control apparatus according to claim 14, wherein the controller is configured to cause the first communication unit to transmit the first signal, to the radiation imaging apparatus, for setting therein respective parameters of the pixel sensitivity setting, the setting of the number of times of non-destructive reading, the analog binning setting, the digital binning setting, the accumulation time setting, and the reading area size setting.

24. A radiation imaging system comprising an imaging unit and an imaging controller configured to perform bidirectional communication with each other,
wherein the imaging unit includes:
a radiation sensor configured to acquire a radiation moving image;
a first connector configured to connect a first cable for receiving a first signal for setting at least one parameter among a pixel sensitivity setting, a setting of a number of times of non-destructive reading for one frame of the radiation moving image, an analog binning setting, a digital binning setting, an accumulation time setting, and a reading area size setting;
a second connector configured to connect a second cable of a pair of bidirectional serial communication lines, for outputting data of the radiation moving image, and for receiving a second signal for setting at least one parameter among a pixel sensitivity setting, a setting of a number of times of non-destructive reading for one frame of the radiation moving image, an analog binning setting, a digital binning setting, an accumulation time setting, and a reading area size setting, wherein the second connector is different from the first connector, and the first connector is configured to connect the first cable which is different from the second cable of the pair of bidirectional serial communication lines; and
a sensor controller configured to receive the first and the second signal, drive the radiation sensor based on the at least one parameter corresponding to one of the first and the second signal, and output the data of the radiation moving image to the imaging controller through the second connector; and
wherein the imaging controller is configured to transmit the second signal to the imaging unit through the second connector, receive the data of the radiation moving image, apply image processing to the data to obtain a processed image, and cause a display unit to display the processed image.

25. The radiation imaging system according to claim 24, wherein the imaging controller is configured to cause the second connector to transmit and receive a signal for synchronizing generating radiation by a radiation generation apparatus and driving of the radiation sensor.

26. The radiation imaging system according to claim 24, wherein the imaging controller is configured to cause the second connector to transmit a signal, to the radiation sensor, for notifying the radiation sensor of a timing at which a radiation generation apparatus generates radiation.

27. The radiation imaging system according to claim 24, further comprising an operation unit configured to receive an operation input for setting the at least one parameter and an operation input for causing the second signal to be transmitted.

28. The radiation imaging system according to claim 24, wherein the first cable is a cable of an Ethernet communication line, and
the radiation imaging system further comprising a state determination unit configured to determine a state of the Ethernet communication line,
wherein the imaging controller is configured to cause the second connector to transmit the second signal to the radiation sensor according to a state of the Ethernet communication line determined by the state determination unit.

29. The radiation imaging system according to claim 28, wherein the state determination unit is configured to determine whether communication is established between the first connector and at least one of a radiation generation apparatus and the radiation sensor.

30. The radiation imaging system according to claim 24, further comprising a state determination unit configured to determine whether communication is established between the first connector and at least one of a radiation generation apparatus and the radiation sensor,
wherein the first cable is a cable of an Ethernet communication line, and
wherein the imaging controller is configured to cause the display unit to display, according to the state of the Ethernet communication line determined by the state determination unit, a GUI (graphical user interface) for receiving an operation input for determining whether to transmit the second signal.

31. The radiation imaging system according to claim 30, wherein the state determination unit determines whether communication is established between the first connector and at least one of the radiation generation apparatus and the radiation sensor.

32. The radiation imaging system according to claim 24, wherein the imaging controller is configured to cause a storage unit to store an image based on the radiation moving image acquired by radiation imaging according to the second signal, and configured to associate the radiation moving image with information indicating that the radiation moving image is acquired according to the second signal.

33. The radiation imaging system according to claim 24, wherein the imaging controller is configured to cause the first connector to transmit the first signal, to the radiation sensor, for setting therein respective parameters of the pixel sensitivity setting, the setting of the number of times of non-destructive reading, the analog binning setting, the digital binning setting, the accumulation time setting, and the reading area size setting.

34. A method for controlling a radiation imaging control apparatus communicable with a radiation imaging apparatus including a radiation sensor and capable of acquiring a radiation moving image, the method comprising:
establishing communication between the radiation sensor and the radiation imaging apparatus via one Ethernet communication line and via at least a pair of bidirectional serial communication lines, which is different from the Ethernet communication line;
transmitting a first signal for setting at least one parameter among a pixel sensitivity setting, a setting of a number of times of non-destructive reading for one frame of the radiation moving image, an analog binning setting, a digital binning setting, an accumulation time setting, and a reading area size setting to the radiation imaging apparatus via the Ethernet communication line;

receiving data of the radiation moving image from the radiation imaging apparatus via the pair of bidirectional serial communication lines;

transmitting a second signal for setting at least one of the pixel sensitivity setting, the setting of the number of times of non-destructive reading for one frame of the radiation moving image, the analog binning setting, the digital binning setting, the accumulation time setting, and the reading area size setting to a predetermined setting, to the radiation imaging apparatus;

performing image processing to the received data to obtain a processed image; and causing a display unit to display the processed image.

35. A non-transitory computer-readable storage medium storing a computer program to be executed by a computer to perform the method of claim 34.

36. A method for controlling a radiation imaging system comprising an imaging unit and an imaging controller configured to perform bidirectional communication with each other, the imaging unit including a radiation sensor configured to acquire a radiation moving image, the method comprising:

controlling the imaging unit to:

receive a first signal for setting at least one parameter among a pixel sensitivity setting, a setting of a number of times of non-destructive reading for one frame of the radiation moving image, an analog binning setting, a digital binning setting, an accumulation time setting and a reading area size setting, via a first connector configured to connect a first cable;

output data of the radiation moving image, and receive a second signal for setting at least one parameter among a pixel sensitivity setting, a setting of a number of times of non-destructive reading for one frame of the radiation moving image, an analog binning setting, a digital binning setting, an accumulation time setting, and a reading area size setting, via a second connector configured to connect a second cable of a pair of bidirectional serial communication lines, wherein the second connector is different from the first connector, and the first connector is configured to connect the first cable which is different from the second cable of the pair of bidirectional serial communication lines; and receive the first and the second signal, and drive the radiation sensor based on the at least one parameter corresponding to one of the first and the second signal, and output the data of the radiation moving image to the imaging controller through the second connector; and controlling the imaging controller to transmit the second signal to the imaging unit through the second connector, receive the data of the radiation moving image, apply image processing to the data to obtain a processed image, and cause a display unit to display the processed image.

37. A non-transitory computer-readable storage medium storing a computer program to be executed by a computer to perform the method of claim 36.

\* \* \* \* \*